(12) United States Patent
Hirose et al.

(10) Patent No.: US 11,718,553 B2
(45) Date of Patent: Aug. 8, 2023

(54) ALKALI-FREE GLASS SUBSTRATE

(71) Applicant: AGC INC., Tokyo (JP)

(72) Inventors: Motoyuki Hirose, Tokyo (JP); Takashi Enomoto, Tokyo (JP)

(73) Assignee: AGC INC., Tokyo (JP)

( * ) Notice: Subject to any disclaimer, the term of this patent is extended or adjusted under 35 U.S.C. 154(b) by 653 days.

(21) Appl. No.: 16/819,696

(22) Filed: Mar. 16, 2020

(65) Prior Publication Data

US 2020/0299179 A1   Sep. 24, 2020

(30) Foreign Application Priority Data

Mar. 19, 2019 (JP) .................. 2019-051570
Nov. 19, 2019 (JP) .................. 2019-208583

(51) Int. Cl.
*C03C 3/091* (2006.01)
*C03B 5/225* (2006.01)
*G11B 5/73* (2006.01)

(52) U.S. Cl.
CPC ............ *C03C 3/091* (2013.01); *C03B 5/2252* (2013.01); *G11B 5/73921* (2019.05); *C03C 2201/80* (2013.01)

(58) Field of Classification Search
None
See application file for complete search history.

(56) References Cited

U.S. PATENT DOCUMENTS

| | | | | |
|---|---|---|---|---|
| 9,580,352 B2* | 2/2017 | Koyama | ........... | C03C 3/091 |
| 10,974,986 B2* | 4/2021 | Hirose | ........... | C03C 3/11 |
| 11,584,680 B2* | 2/2023 | Hirose | ........... | C03C 3/091 |
| 2008/0127679 A1 | 6/2008 | Nishizawa et al. | | |

(Continued)

FOREIGN PATENT DOCUMENTS

| | | |
|---|---|---|
| CN | 104364212 A | 2/2015 |
| CN | 105073670 A | 11/2015 |

(Continued)

OTHER PUBLICATIONS

International Search Report and Written Opinion from PCT/2020/004847 dated Mar. 24, 2020 (19 pages).

(Continued)

*Primary Examiner* — Kevin M Bernatz
(74) *Attorney, Agent, or Firm* — Foley & Lardner LLP

(57) ABSTRACT

An alkali-free glass substrate contains, as represented by mass % based on oxides: 54% to 68% of $SiO_2$; 10% to 25% of $Al_2O_3$; 0.1% to 5.5% of $B_2O_3$; and 8% to 26% of $MgO+CaO+SrO+BaO$. The alkali-free glass substrate has β-OH of 0.15 $mm^{-1}$ to 0.35 $mm^{-1}$, and a Cl content of 0.15 to 0.3 mass %. A bubble growth index I of the alkali-free glass substrate given by the following formula is 320 or more: $I=590.5\times[\beta\text{-OH}]+874.1\times[Cl]-5.7\times[B_2O_3]-33.3$. In the formula, [β-OH] is β-OH of the alkali-free glass substrate in $mm^{-1}$, [Cl] is the Cl content of the alkali-free glass substrate in mass %, and $[B_2O_3]$ is a $B_2O_3$ content of the alkali-free glass substrate in mass %.

20 Claims, 2 Drawing Sheets

(56) References Cited

U.S. PATENT DOCUMENTS

| | | | |
|---|---|---|---|
| 2009/0176640 A1* | 7/2009 | Maehara | C03C 3/091 65/99.2 |
| 2012/0149544 A1 | 6/2012 | Nagai et al. | |
| 2013/0274086 A1 | 10/2013 | Tsujimura et al. | |
| 2015/0045201 A1 | 2/2015 | Tokunaga et al. | |
| 2015/0045203 A1 | 2/2015 | Tokunaga et al. | |
| 2015/0072130 A1 | 3/2015 | Tokunaga et al. | |
| 2015/0087494 A1 | 3/2015 | Tokunaga et al. | |
| 2015/0087495 A1 | 3/2015 | Nishizawa et al. | |
| 2016/0002095 A1 | 1/2016 | Tsujimura et al. | |
| 2016/0068427 A1 | 3/2016 | Tokunaga et al. | |
| 2017/0222321 A1 | 8/2017 | Caratelli et al. | |
| 2019/0107762 A1 | 4/2019 | Nakamura et al. | |
| 2020/0021916 A1 | 1/2020 | Akiyama et al. | |
| 2020/0140314 A1* | 5/2020 | Tomamoto | C03C 3/087 |
| 2020/0161741 A1 | 5/2020 | Hiramatsu et al. | |
| 2020/0199012 A1* | 6/2020 | Hayashi | C03B 17/064 |
| 2020/0238665 A1 | 7/2020 | Sakurai et al. | |
| 2021/0103190 A1 | 4/2021 | Miyake | |

FOREIGN PATENT DOCUMENTS

| | | | |
|---|---|---|---|
| CN | 105271722 A | 1/2016 | |
| CN | 105722800 A | 6/2016 | |
| JP | WO-2011/078258 A | 5/2013 | |
| JP | 5702888 B2 | 4/2015 | |
| JP | 5712922 B2 | 5/2015 | |
| JP | 5849965 B2 | 2/2016 | |
| JP | 2016-029001 A | 3/2016 | |
| JP | 2016-084242 A | 5/2016 | |
| JP | 2016-113363 A | 6/2016 | |
| JP | 2017-007870 A | 1/2017 | |
| JP | 2017-063255 A | 3/2017 | |
| JP | 2017-509266 A | 3/2017 | |
| JP | 2017-090617 A | 5/2017 | |
| JP | 2019-068368 A | 4/2019 | |
| KR | 2008-0022575 A | 3/2008 | |
| KR | 2015-0029632 A | 3/2015 | |
| WO | WO-2008/093580 A1 | 8/2008 | |
| WO | WO-2011/078258 A | 6/2011 | |
| WO | WO-2011078258 A1 * | 6/2011 | C03B 5/2252 |
| WO | WO-2013-161903 A1 | 10/2013 | |
| WO | WO-2013/172307 A1 | 11/2013 | |
| WO | WO-2013/180220 A1 | 12/2013 | |
| WO | WO-2013/183569 A1 | 12/2013 | |
| WO | WO-2013/183626 A1 | 12/2013 | |
| WO | WO-2017/213191 A1 | 12/2017 | |
| WO | WO-2018/016398 A1 | 1/2018 | |
| WO | WO-2018/181626 A1 | 10/2018 | |
| WO | WO-2019/026963 A1 | 2/2019 | |
| WO | WO-2019/070007 A1 | 4/2019 | |
| WO | WO-2019/107514 A1 | 6/2019 | |

OTHER PUBLICATIONS

International Search Report and Written Opinion from PCT/2020/004848 dated Mar. 10, 2020 (17 pages).
International Search Report and Written Opinion from PCT/2020/004850 dated Mar. 10, 2020 (20 pages).
Tanaka, Chikao, "Glass Melting Friendly to Environment: Especially on Technological Removal of Bubbles", New Glass 83, vol. 21, No. 4, 2006, pp. 31-36.

* cited by examiner

ALKALI-FREE GLASS SUBSTRATE

CROSS-REFERENCE TO RELATED APPLICATIONS

This application claims priority from Japanese Patent Application No. 2019-051570 filed on Mar. 19, 2019, and Japanese Patent Application No. 2019-208583 filed on Nov. 19, 2019, the entire subject matters of which are incorporated herein by reference.

BACKGROUND OF THE INVENTION

Technical Field

The present invention relates to an alkali-free glass substrate suitable as a glass substrate for various displays.

Background Art

An alkali-free glass substrate which does not substantially contain alkali metal ions is preferably used for a glass substrate for various displays, particularly one in which a metal, an oxide thin film or the like is formed on a surface thereof, because when an alkali metal oxide is contained, the alkali metal ions diffuse in the thin film to deteriorate film properties.

A glass raw material prepared at a predetermined compounding ratio is melted in a melting tank to be vitrified, the molten glass is fined and thereafter formed into a glass ribbon having a predetermined sheet thickness by a float process or a fusion process, and this glass ribbon is cut into a predetermined shape, thereby obtaining the alkali-free glass substrate used for the purpose described above.

In the refining of the molten glass, there has been known a vacuum degassing method of introducing the molten glass into a reduced pressure atmosphere, allowing bubbles in a continuous flow of molten glass to largely grow under the reduced pressure atmosphere to raise the bubbles contained in the molten glass, breaking and removing the bubbles, and thereafter, discharging the molten glass from the reduced pressure atmosphere. For example, Patent Literature 1 discloses a glass production method comprising a step of subjecting molten glass to vacuum degassing in a vacuum degassing vessel.

For the purposes of glass recycling and improvement of solubility, cullet of used glass is used as a part of a glass material.

[Patent literature 1] WO 2008/093580

[Non-patent literature 1] Chikao Tanaka, "Environment-Friendly Glass Melting Technique: Especially about Technique of Removal of Bubbles," NEW GLASS 83, Vol. 21, No. 4 (2006), pp. 31-36.

BRIEF SUMMARY OF THE INVENTION

With a recent elevated demand for the size increase of liquid crystal displays, size increase of glass substrates for liquid crystal displays is desired. In order to manufacture a large-size glass substrate efficiently, it may be necessary to increase the dimensions of a vacuum degassing apparatus to increase the flow rate of molten glass. Particularly in the case of a vacuum degassing apparatus equipped with a molten glass conduit (vacuum degassing vessel, uprising pipe, or downfalling pipe) made of platinum or a platinum alloy, there is a problem that a large facility investment is necessary.

The production yield of a glass substrate lowers as the substrate size increases even when the average density of bubble defects in the substrate is the same (refer to the related figure in Non-patent literature 1). Thus, in order to increase the size of a glass substrate to be manufactured, it is necessary to make the bubble density in the substrate less than before.

The present invention has been made to solve the above problems and an object of the present invention is therefore to provide an alkali-free glass substrate in which bubbles included in molten glass is removed easily in a reduced-pressure atmosphere.

In order to attain the above-described object, the present invention provides an alkali-free glass substrate containing, as represented by mass % based on oxides: 54% to 68% of $SiO_2$; 10% to 25% of $Al_2O_3$; 0.1% to 5.5% of $B_2O_3$; and 8% to 26% of $MgO+CaO+SrO+BaO$, in which the alkali-free glass substrate has β-OH of 0.15 $mm^{-1}$ to 0.35 $mm^{-1}$, and a Cl content of 0.15 to 0.3 mass %, and in which a bubble growth index I of the alkali-free glass substrate given by the following formula (1) is 320 or more.

$$I = 590.5 \times [\beta\text{-OH}] + 874.1 \times [Cl] - 5.7 \times [B_2O_3] - 33.3 \quad (1)$$

In the formula (1), [β-OH] is β-OH of the alkali-free glass substrate in $mm^{-1}$, [Cl] is the Cl content of the alkali-free glass substrate in mass %, and [$B_2O_3$] is a $B_2O_3$ content of the alkali-free glass substrate in mass %.

The alkali-free glass substrate of the present invention allows bubbles included in molten glass to be removed easily in a reduced-pressure atmosphere.

DETAILED DESCRIPTION OF THE INVENTION

[Alkali-Free Glass Substrate]

Figure 1:
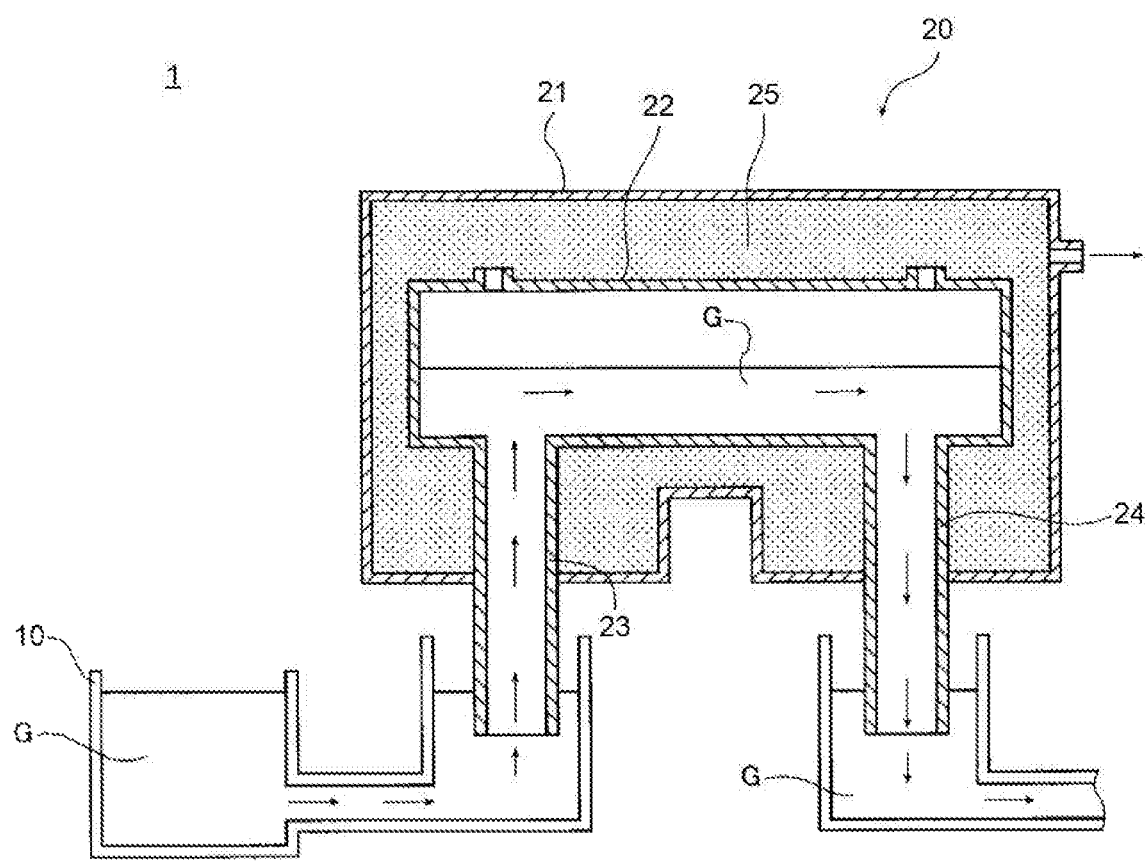
FIG. 1 is a sectional view showing an example of configuration of a glass production apparatus to be used for manufacturing an alkali-free glass substrate of the present invention.

An alkali-free glass substrate according to an embodiment of the present invention will be described below. The "alkali-free glass" means glass that substantially does not contain alkali metal oxides such as $Na_2O$ and $K_2O$, and "substantially not containing alkali metal oxides" herein means that the sum of the contents of alkali metal oxides is 0.1 mass % or less.

The alkali-free glass substrate of the present invention contains, in mass % (in terms of oxides), 54% to 68% of $SiO_2$, 10% to 25% of $Al_2O_3$, 0.1% to 5.5% of $B_2O_3$, and 8% to 26% of $MgO+CaO+SrO+BaO$.

In the following part of the specification, "mass %" may be simply written as "%".

Next, a description of composition ranges of respective components will be made.

In a case where the content of $SiO_2$ is 54% or more, the strain point of the alkali-free glass substrate increases and the resistance to chemicals is high. The content of $SiO_2$ is preferably 57% or more, even preferably 58.5% or more, further preferably 59.5% or more.

In a case where the content of $SiO_2$ is 68% or less, high glass meltability is obtained. The content of $SiO_2$ is preferably 67.5% or less, even preferably 66% or less, further preferably 65% or less.

In a case where the content of $Al_2O_3$ is 10% or more, phase separation is prevented and the strain point of the alkali-free glass substrate increases. The content of $Al_2O_3$ is preferably 16% or more, even preferably 17% or more, further preferably 18% or more.

In a case where the content of $Al_2O_3$ is 25% or less, high glass meltability is obtained. The content of $Al_2O_3$ is preferably 24% or less, even preferably 23% or less, further preferably 22% or less.

In a case where the content of $B_2O_3$ is 0.1% or more, high glass meltability is obtained and the resistance to chemicals of the alkali-free glass substrate is high. The content of $B_2O_3$ is preferably 0.5% or more, even preferably 1% or more, and further preferably 1.8% or more.

In a case where the content of $B_2O_3$ is 5.5% or less, the strain point of the alkali-free glass substrate increases. The content of $B_2O_3$ is preferably 4.5% or less, even preferably 3.0% or less, further preferably 2.5% or less.

In a case where the total content of MgO, CaO, SrO, and BaO (i.e., MgO+CaO+SrO+BaO) is 8% or more, high glass meltability is obtained. The total content of MgO, CaO, SrO, and BaO is preferably 10% or more, even preferably 12% or more, and further preferably 14% or more.

In a case where the total content of MgO, CaO, SrO, and BaO is 26% or less, the strain point of the alkali-free glass substrate becomes high. The total content of MgO, CaO, SrO, and BaO is preferably 24% or less, even preferably 22% or less, further preferably 20% or less.

The alkali-free glass substrate may contain MgO to increase the meltability at the time of glass melting. The content of MgO is preferably 2% or more, even preferably 3% or more, further preferably 4% or more, particularly preferably 4.5% or more.

The content of MgO is preferably 12% or less because phase separation can be prevented. The content of MgO is even preferably 8.5% or less, further preferably 7.5% or less, particularly preferably 7% or less.

The alkali-free glass substrate may contain CaO to increase the meltability in glass melting. The content of CaO is preferably 1.5% or more, even preferably 3% or more, further preferably 4% or more.

The content of CaO is preferably 15% or less because the degree of mixing of phosphorus which is an impurity in limestone ($CaCO_3$) as a material of CaO becomes low. The content of CaO is even preferably 8.5% or less, further preferably 8% or less, particularly preferably 7% or less.

The alkali-free glass substrate may contain SrO to increase the meltability in glass melting. The content of SrO is preferably 0.5% or more, even preferably 2% or more, further preferably 2.5% or more The content of SrO is preferably 16% or less because the acid resistance becomes high. The content of SrO is even preferably 10% or less, further preferably 8.5% or less, particularly preferably 8% or less.

The alkali-free glass substrate may contain BaO to increase the glass meltability. The content of BaO is preferably 0.1% or more.

The content of BaO is preferably 15% or less because segregation is less prone to occur when the material melts. The content of BaO is preferably 10% or less, even preferably 8% or less, further preferably 4% or less, particularly preferably 2.5% or less.

The first embodiment of preferable compositions of the alkali-free glass substrate of the present invention contains:
$SiO_2$: 58.5% to 67.5%;
$Al_2O_3$: 18% to 24%;
$B_2O_3$: 0.1% to 1.7%;
MgO 4% to 8.5%;
CaO: 3% to 8.5%;
SrO: 2% to 10%; and
BaO: 0% to 2.5%.

The second embodiment of preferable compositions of the alkali-free glass substrate of the present invention contains:
$SiO_2$: 57% to 67.5%;
$Al_2O_3$: 17% to 25%;
$B_2O_3$: 1.8% to 5.5%;
MgO 2% to 8.5%;
CaO: 1.5% to 8%;
SrO: 0.5% to 8.5%; and
BaO: 0% to 1%.

In the alkali-free glass substrate of the present invention, β-OH, which is used as an index of a water content in glass, is within a range of 0.15 $mm^{-1}$ to 0.35 $mm^{-1}$. In a case where β-OH is 0.15 $mm^{-1}$ or more, water in the glass flows into bubbles on a reduced-pressure atmosphere to facilitate growth of the bubbles. The parameter β-OH is preferably 0.18 $mm^{-1}$ or more, even preferably 0.2 $mm^{-1}$ or more, further preferably 0.22 $mm^{-1}$ or more.

If β-OH is 0.35 $mm^{-1}$ or less, excessive growth of bubbles can be prevented, and thus passing-through of bubbles during vacuum degassing due to excessive thickening of a bubble layer can be prevented. The parameter β-OH is preferably 0.32 $mm^{-1}$ or less, even preferably 0.3 $mm^{-1}$ or less, further preferably 0.28 $mm^{-1}$ or less.

The parameter β-OH can be calculated according to the following formula by measuring a transmittance of an alkali-free glass substrate test piece provided by shaping molten glass as subjected to vacuum degassing into plate form using a Fourier transform infrared spectrophotometer (FT-IR):

$$\beta\text{-OH}=(1/X)\log_{10}(T_1/T_2)$$

Each expression in the formula means as follows:
X: glass thickness (mm);
$T_1$: transmittance (%) at a reference wave number 4,000 $cm^{-1}$; and
$T_2$: minimum transmittance (%) around hydroxyl group absorption wave number 3,570 $cm^{-1}$.

The parameter β-OH depends on the water content in a glass material, the water vapor density in a melting vessel, the burner combustion method in the melting vessel (oxygen combustion or air combustion), etc. In particular, β-OH can be controlled easily by making adjustments in the burner combustion method. Specifically, the oxygen combustion ratio of the burner combustion is set large to increase β-OH, and the air combustion ratio of the burner combustion is set large to decrease β-OH.

In the alkali-free glass substrate of the present invention, the content of Cl with respect to the glass basic composition is within the range of 0.15 to 0.3 mass %. Cl in glass is a component that facilitates growth of bubbles included in molten glass in a reduced-pressure atmosphere. If the Cl content is 0.15 mass % or less, the growth of bubbles tends to be insufficient. The Cl content is preferably 0.18 mass % or more, even preferably 0.2 mass % or more. If the Cl content is more than 0.3 mass %, the bubble layer is easily formed by the enlargement of the bubble layer during the vacuum degassing treatment. The Cl content is preferably 0.28 mass % or less, even preferably 0.25 mass % or less.

In the alkali-free glass substrate of the present invention, the bubble growth index I that is given by the following formula (1) is 320 or more:

$$I=590.5\times[\beta\text{-OH}]+874.1\times[\text{Cl}]-5.7\times[B_2O_3]-33.3 \quad (1)$$

In the formula (1), [β-OH] is β-OH of the alkali-free glass substrate in $mm^{-1}$, [Cl] is the Cl content of the alkali-free glass substrate in mass %, and [$B_2O_3$] is the $B_2O_3$ content of the alkali-free glass substrate in mass %.

The bubble growth index I is an index indicating how easily bubbles included in molten glass grow in a reduced-pressure atmosphere. In a case where the bubble growth index I is 320 or more, bubbles included in molten glass grow easily in a reduced-pressure atmosphere. The bubble growth index I is preferably 330 or more, even preferably 340 or more.

The bubble growth index I being 400 or less is preferable because occurrence of re-boiling of molten glass flowing through the vacuum degassing vessel can be prevented. Here, "re-boiling" means a phenomenon that bubbles are generated at the interface between glass and a vacuum degassing vessel made of platinum, a platinum alloy, or a dense refractory. The bubble growth index I is even preferably 390 or less, further preferably 380 or less.

In this specification, the bubble growth index I is correlated with the pressure P that is defined as follows.

When the pressure in the vacuum degassing vessel is lowered with the temperature kept constant, the volumes (diameters) of bubbles existing in molten glass in the vacuum degassing vessel increase according to Boyle's law. However, when the pressure in the vacuum degassing vessel has been lowered to a certain value, the volumes (diameters) of bubbles existing in molten glass start to increase rapidly without following Boyle's law. This pressure is defined as a "pressure P."

A pressure P can be determined according to the following procedure. In order to reproduce a situation in the vacuum degassing vessel, a silica glass crucible containing alkali-free glass cullet is set in a vacuum container. The alkali-free glass is melted by heating the crucible to 1,450° C. After the alkali-free glass is melted completely, diameters of bubbles in the molten glass are observed while the pressure in the vacuum container is lowered. In order to observe the diameter of the bubbles in the molten glass, the bubbles in the molten glass may be observed through an observation window of the vacuum container using a CCD camera. The number of bubble samples for measurement of a bubble diameters is 20 or more.

As the pressure in the vacuum container is lowered, the diameters of bubbles existing in the molten glass increase according to Boyle's law. After the pressure in the vacuum container has been lowered to a certain pressure, the diameters of bubbles existing in the molten glass start to increase rapidly without following Boyle's law. This pressure in the vacuum container at this time is employed as a "pressure P."

The present inventors determined bubble growth index I on the basis of pressure P measurement results of plural kinds of alkali-free glass substrates, and have found that in alkali-free glass substrates that allow bubbles included in molten glass to be removed easily in a reduced-pressure atmosphere, the bubble growth index I that is given by the formula (1) is 320 or more.

The alkali-free glass substrate of the present invention may contain $Fe_2O_3$ as a trace component. The content of $Fe_2O_3$ is preferably 0.1 mass % or less, even preferably 0.05 mass % or less.

The strain point of the alkali-free glass substrate of the present invention is preferably 690° C. or more because thermal contraction in panel manufacturing can be reduced, even preferably 700° C. or more.

The strain point is preferably 750° C. or less because the temperatures in a float bath and at the exit of the float bath need not be set very high and influences on the life of each of metal components located in the float bath and in downstream side of the float bath are small. The strain point is even preferably 740° C. or less, further preferably 730° C. or less.

A strain point was measured by a fiber expansion method prescribed in JIS R3103-2 (2001).

The alkali-free glass substrate of the present invention preferably has a Young's modulus of 78 GPa or more because bending of the glass substrate in carrying due to an increase of the size and thinning of the glass substrate can be prevented. The Young's modulus is even preferably 79 GPa or more, further preferably 80 GPa or more, particularly preferably 82 GPa or more. In a case where the Young's modulus is too high, cutting property of the glass deteriorates. Therefore, the Young's modulus is preferably 95 GPa or less, even preferably 92 GPa or less, further preferably 90 GPa or less. The Young's modulus was measured by ultrasonic method.

In the alkali-free glass substrate of the present invention, the substrate preferably has a short side length of 2,100 mm or more and a long side length of 2,400 mm or more, even preferably a short side length of 2,800 mm or more and a long side length is 3,000 mm or more, further preferably a short side length of 2,900 mm or more and a long side length of 3,200 mm or more.

Usually, it becomes necessary to decrease the density of bubbles in a substrate as the substrate size increases. In contrast, in the alkali-free glass substrate of the present invention, since the density of bubbles is low, the production yield is not prone to decrease even when the substrate size is large. The alkali-free glass substrate of the present invention is suitable for a case that the substrate size is large.

The substrate preferably has a short side length of 6,000 mm or less and a long side length of 6,500 mm or less. This is because if the substrate size is too large, a resulting increase in the size of a facility requires a large facility investment and it becomes difficult to convey glass substrates.

In the alkali-free glass substrate of the present invention, the density of bubbles having diameters of more than 100 μm is preferably 0.06 pieces/kg or less, even preferably 0.03 pieces/kg or less, further preferably 0.01 pieces/kg or less.

The density of bubbles having diameters of more than 100 μm was calculated by determining the number of bubble defects whose sizes were more than 100 μm by an edge light test in which a major surface of a glass substrate was checked by illuminating the glass from a side surface in a darkroom.

The alkali-free glass substrate of the present invention is preferably a float glass. The float method is superior to the fusion method for formation of glass substrates having a large substrate size.

In the alkali-free glass substrate of the present invention, when the alkali-free glass substrate is melted in a vessel to form a molten glass, and while holding a temperature in the vessel at 1450° C., a pressure in the vessel is reduced from an atmospheric pressure to 44 kPa at a constant pressure reduction rate for 20 minutes and held at 44 kPa for 5 minutes, a diameter of a grown bubble is preferably equal to or more than three times a diameter of an initial bubble. The initial bubble is a bubble having a diameter of 0.1 mm to 0.3 mm contained in a molten glass at 1450° C. before starting pressure reduction is defined as the initial bubble, and the grown bubble is a bubble which corresponds to the initial bubble and is obtained after held at 44 kPa for 5 minutes.

In a case where the diameter of the grown bubble is three times or more of the diameter of the initial bubble, bubbles included in molten glass grow easily and rise to the surface of the molten glass in a reduced-pressure atmosphere. Thus, bubbles included in the molten glass can be removed easily.

A diameter of an initial bubble and a diameter of a grown bubble can be determined according to the following procedure.

A silica cell containing cullet of an alkali-free glass substrate is set in a vacuum container. The pressure in the vacuum container is reduced after melting the cullet by heating the silica cell to 1,450° C. Bubbles included in the molten glass are photographed using a CCD camera through an observation window of the vacuum container and their diameters (hereinafter referred to as "bubble diameters") are measured by image analysis. It is not necessary to measure diameters of all of plural bubbles found in an image. More specifically, for example, a bubble adhered to the wall surface of the silica cell and a bubble of a plurality of bubbles combined with each other are excluded from targets of measurement. In an embodiment of the present invention, the ratio (bubble growth ratio) of a diameter of a grown bubble with respect to a diameter of an initial bubble is an average of bubble growth ratios calculated for plural respective bubbles found in an image.

As for the pressure reduction condition for evaluation, the pressure is reduced from atmospheric pressure to 44 kPa at a constant rate in 20 minutes. When the pressure applied to the molten glass to 44 kPa is reduced, bubbles included in the molten glass grow sufficiently, which is suitable for evaluation of the increase of bubble diameters. In a case where the pressure reduction time is 20 minutes, it is possible to evaluate the increase of bubble diameters properly in a short evaluation time.

A bubble having a diameter of 0.1 mm to 0.3 mm is selected as an initial bubble. In a case where the diameter of the initial bubble is 0.1 mm or more, it is easy to measure bubble diameters by the CCD camera. In a case where the diameter of the initial bubble is 0.3 mm or less, the increase of bubble diameters can be measured properly because excessive growth of bubbles leading to rapture can be prevented.

A bubble after held at 44 kPa for 5 minutes corresponding to an initial bubble is employed as a grown bubble. In a case where the holding time is 5 minutes, the grown bubble becomes sufficiently larger than the initial bubble and excessive growth of bubbles leading to rapture can be prevented, so that increase of bubble diameters can be evaluated properly.

In the alkali-free glass substrate of the present invention, the grown bubble preferably has a diameter equal to or more than 3.5 times the diameter of the initial bubble, even preferably equal to or more than 4 times the diameter of the initial bubble.

In the alkali-free glass substrate of the present invention, the diameter of the grown bubble is preferably equal to or less than 15 times the diameter of the initial bubble. In a case where the diameter of the grown bubble is equal to or less than 15 times the diameter of the initial bubble, a bubble layer that is usually present with a thickness of about 10 mm or less on a surface of the molten glass is prevented from being enlarged to a thickness of 10 mm to several hundred mm in the vacuum deforming process. Therefore, passing through of bubbles can be prevented. The term "passing though of bubbles" means a phenomenon that bubbles that have risen to the glass surface form a bubble layer without rupturing, thereby being stably present for a long time, and bubbles that rise later do not rupture and flow out to the next process as they are. The passing though of bubbles causes a problem that bubbles remain in molten glass after vacuum degassing.

In the alkali-free glass substrate of the present invention, the diameter of the grown bubble is even preferably equal to or less than 10 times the diameter of the initial bubble, even preferably equal to or less than 8 times the diameter of the initial bubble, particularly preferably equal to or less than 6 times the diameter of the initial bubble.

The alkali-free glass substrate of the present invention preferably has, as a glass substrate for a liquid crystal display, a sheet thickness of 0.75 mm or less, even preferably 0.55 mm or less, further preferably 0.5 mm or less, particularly preferably 0.45 mm or less. The sheet thickness is preferably 0.1 mm or more, even preferably 0.2 mm or more.

[Manufacturing Method of Alkali-Free Glass Substrate]

Next, a manufacturing method of the alkali-free glass substrate of the embodiment of the present invention will be described with reference to the drawings. FIG. 1 is a sectional view showing an example of a configuration of a glass production apparatus to be used for manufacturing the alkali-free glass substrate of the present invention.

The glass production apparatus 1 is equipped with a melting tank 10 and a vacuum degassing apparatus 20. A shaping machine such as a float bath is disposed in succession to the vacuum degassing apparatus 20. The shaping machine may be one to be used for a down-draw method.

In the manufacturing method of an alkali-free glass substrate, molten glass G is produced by melting a glass material in the melting tank 10 and subjected to vacuum degassing in the vacuum degassing apparatus 20. A band-plate-shaped glass ribbon obtained by shaping by the shaping machine is cooled gradually and cut into alkali-free glass substrates.

The melting tank 10 is equipped with burners for melting a glass material supplied. The burners form fires by mixing fuel such as natural gas, heavy oil, or the like with a gas and burning the mixture. Burners that mainly use air as the gas are called air combustion burners, and burners that mainly use oxygen as the gas are called oxygen combustion burners. The burners heat the glass material from above by emitting fires toward them. The melting tank 10 may be provided with electrodes for heating the glass material.

The glass material may be prepared by mixing, for example, silica sand, boric acid, limestone, aluminum oxide, strontium carbonate, magnesium oxide, etc. to obtain the composition of an intended alkali-free glass substrate.

As described above, since in the alkali-free glass substrate of the present invention bubbles included in molten glass can be removed easily in a reduced-pressure atmosphere, it is preferable to use, as the glass material, cullet generated at the time of manufacture of alkali-free glass substrates or cullet of used alkali-free glass substrates.

A chloride-based refining agent is preferably added to the glass material. From the viewpoint of no probability of occurrence of deliquescence, the chloride-based refining agent is preferably $BaCl_2 \cdot 2H_2O$, $SrCl_2 \cdot 6H_2O$, $CaCl_2$), $MgCl_2 \cdot 6H_2O$, or $NH_4Cl$.

In order to adjust the bubble growth ratio to a proper value, a refining agent may be one other than the chloride-based refining agent. Examples of the refining agent used for this purpose include $SO_3$, F, $SnO_2$, or the like, and its content in the glass material is preferably 2 mass % or less, even preferably 1 mass % or less, further preferably 0.5 mass % or less.

The vacuum degassing apparatus 20 is equipped with a vacuum housing 21, a vacuum degassing vessel 22, an uprising pipe 23, a downfalling pipe 24, and a heat insulating material 25.

The vacuum degassing vessel 22 which is shaped like a cylinder is housed in the vacuum housing 21 such that its longitudinal axis extends in the horizontal direction. The uprising pipe 23 which extends in the vertical direction is attached to the bottom surface of one end of the vacuum degassing vessel 22 and the downfalling pipe 24 is attached to the bottom surface of the other end of the vacuum degassing vessel 22. Parts of the uprising pipe 23 and the downfalling pipe 24 are located inside the vacuum housing 21.

The uprising pipe 23 communicates with the vacuum degassing vessel 22 and introduces molten glass G into the vacuum degassing vessel 22 from the melting tank 10. The downfalling pipe 24 communicates with the vacuum degassing vessel 22 and guides vacuum-degassed molten glass G to the next processing vessel. In the vacuum housing 21, the heat insulating material 25 such as heat insulation brick is provided around the vacuum degassing vessel 22, the part of the uprising pipe 23, and the part of the downfalling pipe 24 so as to cover them in a thermally insulated manner.

The vacuum degassing vessel 22, the uprising pipe 23, and the downfalling pipe 24 are conduits for molten glass, and therefore, are prepared using a material that is superior in heat resistance and corrosion resistance to molten glass. For example, they are made of platinum, a platinum alloy, or reinforced platinum in which a metal oxide is dispersed in platinum or a platinum alloy. Alternatively, they may be made of a ceramic, non-metal inorganic material, that is, a dense refractory. The dense refractory may be lined with platinum or a platinum alloy.

Vacuum degassing is performed by causing molten glass G supplied from the melting tank 10 to pass through the vacuum degassing vessel 22 whose pressure is reduced to a prescribed value. The molten glass G is preferably supplied to and discharged from the vacuum degassing vessel 22 continuously. The flow rate of molten glass G is preferably 1 to 200 tons/day from the viewpoint of productivity.

In order to prevent occurrence of a temperature difference from molten glass G supplied from the melting tank 10, the vacuum degassing vessel 22 is preferably heated so that the inside temperature is within a range of 1,200° C. to 1,600° C., particularly preferably 1,350° C. to 1,550° C.

In performing vacuum degassing, the air inside the vacuum housing 21 is exhausted through a suction opening portion formed in the vacuum housing 21 at a predetermined position from the outside by a pressure reducing means such as a vacuum pump. As a result, the air inside the vacuum degassing vessel 22 which is housed in the vacuum housing 21 is exhausted indirectly, and the pressure inside the vacuum degassing vessel 22 is reduced to a predetermined value.

The pressure inside the vacuum degassing vessel 22 is preferably within a range of 15 kPa to 55 kPa.

EXAMPLES

The present invention will be described in more detail below using Examples and Comparative Examples. How-ever, the present invention is not limited by the following description. Cases 1, 4 to 7, 9, 10, 12, 13, 15, 16 and 18 are Examples and Cases 2, 3, 8, 11, 14 and 17 are Comparative Examples.

First Example Experiment

Using the glass production apparatus 1 shown in FIG. 1, molten glass G was produced by melting a glass material having an alkali-free glass composition in the melting tank 10, subjected to vacuum degassing in the vacuum degassing apparatus 20, and shaped by a float method into a band-plate-shaped glass ribbon. The glass ribbon was cooled gradually and cut to prepare an alkali-free glass substrate having a sheet thickness of 0.50 mm (Cases 1 and 2).

The glass composition of Case 1, as represented by mass % based on oxides, was 61.2% of $SiO_2$, 20.0% of $Al_2O_3$, 2.0% of $B_2O_3$, 5.3% of MgO, 4.5% of CaO, 7.0% of SrO, and 0.1% of BaO (MgO+CaO+SrO+BaO=16.9%). The content of Cl with respect to the glass basic composition was 0.234 mass %. A value of β-OH measured by the following method was 0.329 $mm^{-1}$.

(β-OH)

The parameter β-OH was determined by measuring absorbance values of a glass sample for light whose wavelength is within a range of 2.75 μm to 2.95 μm and dividing a maximum value $β_{max}$ of the absorbance values by its thickness (mm).

The bubble growth index I was 354, which was calculated as follows: I=590.5×0.329+874.1×0.234−5.7×2.0−33.3=354.

The glass composition of Case 2, as represented by mass % based on oxides, was 62% of $SiO_2$, 18% of $Al_2O_3$, 9.5% of $B_2O_3$, 2% of MgO, 7% of CaO, 1.2% of SrO, 0.1% of BaO (MgO+CaO+SrO+BaO=10.3%), and 0.2% of $SnO_2$. The content of Cl with respect to the glass basic composition is 0 mass %. A value of β-OH measured by the above method was 0.47 $mm^{-1}$.

Thus, the bubble growth index I was 190, which was calculated as follows: I=590.5×0.47+874.1×0−5.7×9.5−33.3=190.

In order to reproduce an atmosphere for perform vacuum degassing, a silica cell containing 50 g of cullet of an alkali-free glass substrate was disposed in a vacuum container. An HTO (high temperature observation) furnace manufactured by Glass Service, Inc was used as the vacuum container. After the cullet was melted by heating the silica cell from room temperature to 1,450° C., reduction of the pressure inside the vacuum container was started. The pressure was reduced from atmospheric pressure to 44 kPa at a constant rate in 20 minutes, while holding the inside of the vacuum container at 1,450° C., and held at 44 kPa for 10 minutes. During this time, bubbles in the molten glass was photographed through an observation window of the vacuum container with a CCD camera at the start of the pressure reduction (0 minute) and 3, 6, 9, 12, 15, 18, 20, 21, 22, 23, 24, 25, 26, 27, 28, 29, and 30 minutes after the start of the pressure reduction. Bubble diameters were measured by an image analysis. In the first example experiment, the bubble at 0 minute was the initial bubble, and the bubble at 25 minutes after the start of the pressure reduction was the grown bubble.

Figure 2:
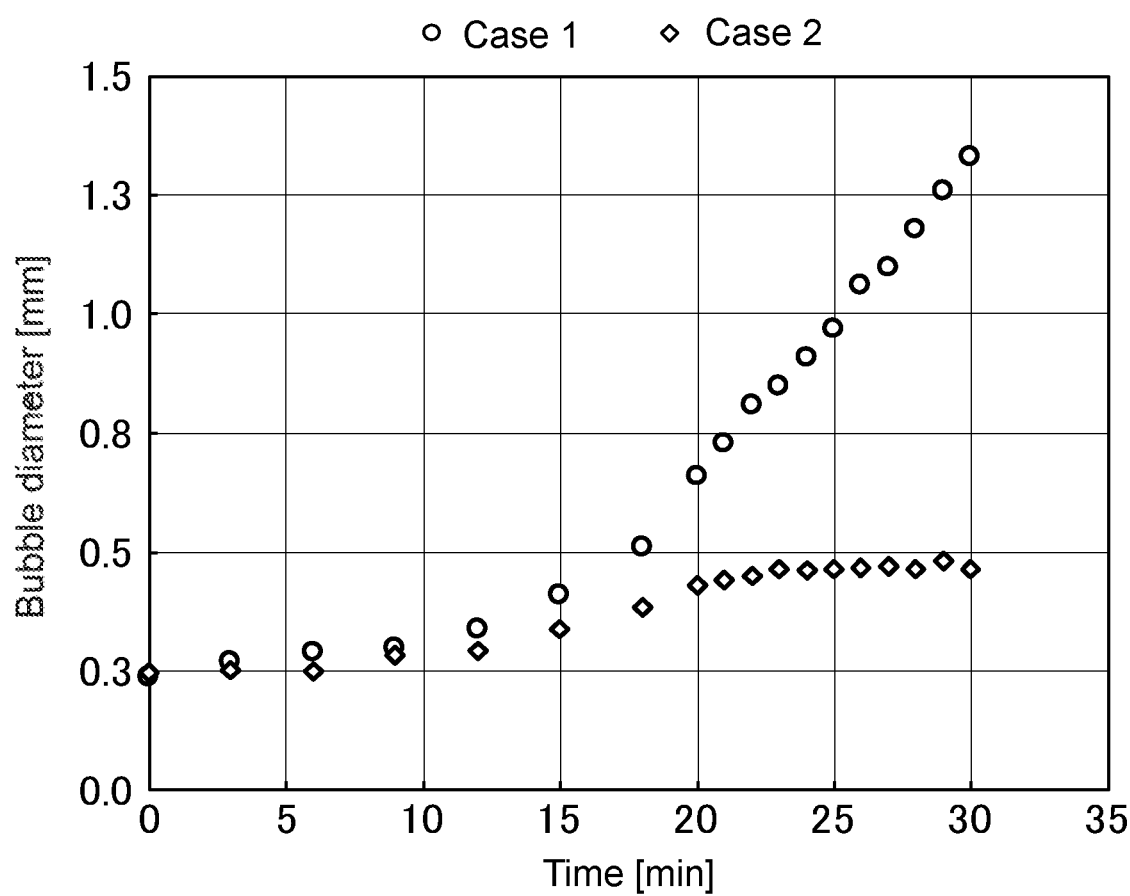
FIG. 2 is a graph showing how the bubble diameter varied with time under a reduced pressure condition in a first example experiment.

FIG. 2 is a graph showing how the bubble diameter varied with time under a reduced pressure condition in the first example experiment. Comparison between Cases 1 and 2 shows that, while the pressure was kept at 44 kPa, the diameter of bubbles increased more in Case 1 than in Case 2. In Case 1, the diameter of the initial bubble was 0.24 mm and the diameter of the grown bubble was 0.97 mm. The diameter of the grown bubble was 4.0 times the diameter of the initial bubble. On the other hand, in Case 2, the diameter of the initial bubble was 0.25 mm and the diameter of the grown bubble was 0.47 mm. The diameter of the grown bubble was 1.9 times the diameter of the initial bubble. It has therefore been found that the alkali-free glass substrate of Case 1 allows bubble included in molten glass to be removed easily in a reduced pressure atmosphere.

The first example experiment and the second example experiment described below are different in that the temperatures of the molten glass are 1,450° C. and 1400° C., and the pressures in the vacuum container (vacuum degassing vessel) are 44 kPa and 33.33 kPa, respectively. This is because if the first example experiment is conducted with the reduced pressure of 33.33 kPa, bubbles in the molten glass grow excessively and photographing with a CCD camera becomes difficult.

Second Example Experiment

The refining effect of molten glass in the vacuum degassing vessel was evaluated by a simulation. The rising speed of bubbles in a flow of the molten glass grown to rise through the molten glass is correlated with the bubble diameter by the Stokes equation. Thus, in the simulation, a bubble diameter was calculated on the basis of a bubble growth ratio and the behavior of a bubble rise was analyzed according to the Stokes equation. A calculation was performed by assuming that bubbles are generated at the center of the portion where the uprising pipe was attached to the vacuum degassing vessel and setting the diameter of initial bubbles at 0.2 mm.

Dimensions of the vacuum degassing vessel and the height of a liquid surface of molten glass were set as follows.

Horizontal distance from the center of the uprising pipe to the center of the downfalling pipe in the vacuum degassing vessel: 10 m Inner diameter of the vacuum degassing vessel: 500 mm Liquid surface height of molten glass: 250 mm The kinds of molten glass passing through the vacuum degassing vessel were assumed as the following. Their glass compositions were described below. For Cl contents, refer to Table 1 shown later. The contents of the components of each glass basic composition are represented by mass % based on oxides. The Cl contents are in mass % with respect to the glass basic composition.

Cases 3 to 14: 61.2% of $SiO_2$, 20.0% of $Al_2O_3$, 2.0% of $B_2O_3$, 5.3% of MgO, 4.5% of CaO, 7.0% of SrO, 0.1% of BaO (MgO+CaO+SrO+BaO=16.9%)

Case 15: 61.6% of $SiO_2$, 20.9% of $Al_2O_3$, 0.1% of $B_2O_3$, 6.1% of MgO, 4.6% of CaO, 6.8% of SrO, 0.1% of BaO (MgO+CaO+SrO+BaO=17.6%)

Case 16: 61.2% of $SiO_2$, 20.1% of $Al_2O_3$, 1.8% of $B_2O_3$, 5.4% of MgO, 4.5% of CaO, 7.0% of SrO, 0.1% of BaO (MgO+CaO+SrO+BaO=17.0%) Case 17: 60.9% of $SiO_2$, 19.5% of $Al_2O_3$, 3.5% of $B_2O_3$, 4.9% of MgO, 4.4% of CaO, 7.1% of SrO, 0.1% of BaO (MgO+CaO+SrO+BaO=16.6%)

Case 18: 60.7% of $SiO_2$, 19.1% of $Al_2O_3$, 5.5% of $B_2O_3$, 4.6% of MgO, 4.4% of CaO, 7.3% of SrO, 0.1% of BaO (MgO+CaO+SrO+BaO=16.3%)

Flow rate of molten glass: 0.6 m³/h or 1.5 m³/h

Pressure in the vacuum degassing vessel: 33.33 kPa

Temperature (average) when molten glass passes through vacuum degassing vessel: 1,400° C.

Viscosity when molten glass passes through the vacuum degassing vessel: 150 Pa·s to 200 Pa·s Density when molten glass passes through the vacuum degassing vessel: 2,380 kg/m³

As for the degassing performance, a distance (distance for rising) in the vacuum degassing vessel from the center of the uprising pipe to a position where bubbles reach the surface of molten glass was evaluated. The shorter the distance for rising, the higher the degassing performance.

Results are shown in Table 1. Table 1 shows values of the flow rate of molten glass, the content of $B_2O_3$, β-OH, the content of Cl, the bubble growth index I, the bubble growth ratio, and the distance for rising. The bubble growth ratio was measured under the same conditions as in the first example experiment.

TABLE 1

| | Flow rate (m³/h) | $B_2O_3$ (wt %) | β-OH ($mm^{-1}$) | Cl content (%) | Bubble growth index I | Bubble growth ratio | Distance for rising (m) |
|---|---|---|---|---|---|---|---|
| Case 3 | 0.6 | 2.0 | 0.45 | 0.00 | 221 | 2.3 | >10 |
| Case 4 | 0.6 | 2.0 | 0.45 | 0.15 | 352 | 4.0 | 3.4 |
| Case 5 | 1.5 | 2.0 | 0.45 | 0.15 | 352 | 4.0 | 8.3 |
| Case 6 | 0.6 | 2.0 | 0.35 | 0.25 | 381 | 4.3 | 3.0 |
| Case 7 | 1.5 | 2.0 | 0.35 | 0.25 | 381 | 4.3 | 7.3 |
| Case 8 | 0.6 | 2.0 | 0.30 | 0.15 | 264 | 2.8 | >10 |
| Case 9 | 1.5 | 2.0 | 0.30 | 0.25 | 351 | 4.0 | 8.3 |
| Case 10 | 1.5 | 2.0 | 0.25 | 0.25 | 321 | 3.6 | 9.9 |
| Case 11 | 0.6 | 2.0 | 0.25 | 0.15 | 234 | 2.5 | >10 |
| Case 12 | 0.6 | 2.0 | 0.20 | 0.30 | 336 | 3.8 | 3.7 |
| Case 13 | 1.5 | 2.0 | 0.20 | 0.30 | 336 | 3.8 | 9.1 |
| Case 14 | 1.5 | 2.0 | 0.20 | 0.25 | 292 | 3.2 | >10 |
| Case 15 | 1.5 | 0.1 | 0.30 | 0.25 | 362 | 4.1 | 8.4 |
| Case 16 | 1.5 | 1.8 | 0.25 | 0.25 | 323 | 3.6 | 9.9 |
| Case 17 | 1.5 | 3.5 | 0.25 | 0.25 | 313 | 3.5 | >10 |
| Case 18 | 1.5 | 5.5 | 0.25 | 0.30 | 345 | 3.9 | 3.2 |

As shown in Table 1, the distance for rising was longer than 10 m in the glass whose bubble growth index I was less than 320 (Cases 3, 8, 11, 14, and 17). From this result, it is expected that the density of bubbles having diameters of more than 100 μm in a glass substrate would be more than 0.06 pieces/kg.

In contrast, the distance for rising was 10 m or shorter in the glass whose bubble growth index I was 320 or more (Cases 4 to 7, 9, 10, 12, 13, 15, 16, and 18). From this result, it is expected that the density of bubbles whose diameters are more than 100 μm in a glass substrate would be less than or equal to 0.06 pieces/kg.

It is concluded from the above results that, in the glass of Examples, it is not necessary to increase the size of a vacuum degassing apparatus to manufacture large-size glass substrates efficiently. Thus, the problem of a large cost for facility investment can be solved. Furthermore, since the density of bubbles in a substrate can be reduced, the problem that the production yield decreases as the substrate size increases is expected to be solved.

While the present invention has been described in detail and with reference to specific embodiments thereof, it will be apparent to one skilled in the art that various changes and modifications can be made therein without departing from the spirit and scope thereof.

INDUSTRIAL APPLICABILITY

The alkali-free glass substrate can be used for liquid crystal displays, organic EL displays, flat panel displays and other various applications.

DESCRIPTION OF REFERENCE NUMERALS AND SIGNS

1: Glass production apparatus
10: Melting tank
20: Vacuum degassing apparatus
21: Vacuum housing
22: Vacuum degassing vessel
23: Uprising pipe
24: Downfalling pipe
25: Heat insulating material

The invention claimed is:

1. An alkali-free glass substrate comprising, as represented by mass % based on oxides:
54% to 68% of $SiO_2$;
10% to 25% of $Al_2O_3$;
0.1% to 5.5% of $B_2O_3$; and
8% to 26% of MgO+CaO+SrO+BaO,
wherein the alkali-free glass substrate is free from $SnO_2$;
wherein the alkali-free glass substrate has β-OH of 0.15 $mm^{-1}$ to 0.35 $mm^{-1}$, and a Cl content of 0.15 to 0.3 mass %, and
wherein a bubble growth index I of the alkali-free glass substrate given by the following formula (1) is 320 or more:

$$I=590.5\times[\beta\text{-OH}]+874.1\times[Cl]-5.7\times[B_2O_3]-33.3 \qquad (1)$$

wherein [β-OH] is β-OH of the alkali-free glass substrate in $mm^{-1}$, [Cl] is the Cl content of the alkali-free glass substrate in mass %, and [$B_2O_3$] is a $B_2O_3$ content of the alkali-free glass substrate in mass %.

2. The alkali-free glass substrate according to claim 1, wherein the bubble growth index I given by the formula (1) is 400 or less.

3. The alkali-free glass substrate according to claim 1, having a strain point of 690° C. to 750° C.

4. The alkali-free glass substrate according to claim 1, comprising, as represented by mass % based on oxides:
0% to 12% of MgO;
0% to 15% of CaO:
0% to 16% of SrO; and
0% to 15% of BaO.

5. The alkali-free glass substrate according to claim 1, comprising, as represented by mass % based on oxides:
58.5% to 67.5% of $SiO_2$;
18% to 24% of $Al_2O_3$;
0.1% to 1.7% of $B_2O_3$; and
4% to 8.5% of MgO;
3% to 8.5% of CaO:
2% to 10% of SrO; and
0% to 2.5% of BaO.

6. The alkali-free glass substrate according to claim 1, comprising, as represented by mass % based on oxides:
57% to 67.5% of $SiO_2$;
17% to 25% of $Al_2O_3$;
1.8% to 5.5% of $B_2O_3$; and
2% to 8.5% of MgO;
1.5% to 8% of CaO:
0.5% to 8.5% of SrO; and
0% to 1% of BaO.

7. The alkali-free glass substrate according to claim 1, having a Young's modulus of 78 GPa or more.

8. The alkali-free glass substrate according to claim 1, having a sheet thickness of 0.1 mm to 0.5 mm.

9. The alkali-free glass substrate according to claim 1, having a short side length of 2,100 mm or more and a long side length of 2,400 mm or more.

10. The alkali-free glass substrate according to claim 1, having a short side length of 2,900 mm or more and a long side length of 3,200 mm or more.

11. The alkali-free glass substrate according to claim 1, having a density of bubbles that have diameters of more than 100 μm being 0.06 pieces/kg or less.

12. The alkali-free glass substrate according to claim 1,
wherein when the alkali-free glass substrate is melted in a vessel to form a molten glass, and while holding a temperature in the vessel at 1450° C., a pressure in the vessel is reduced from an atmospheric pressure to 44 kPa at a constant pressure reduction rate for 20 minutes and held at 44 kPa for 5 minutes, a diameter of a grown bubble is equal to or more than three times a diameter of an initial bubble,
wherein the initial bubble is a bubble having a diameter of 0.1 mm to 0.3 mm contained in the molten glass at 1450° C. before starting pressure reduction, and
the grown bubble is a bubble which corresponds to the initial bubble and is obtained after held at 44 kPa for 5 minutes.

13. The alkali-free glass substrate according to claim 12, wherein the diameter of the grown bubble is equal to or less than 15 times the diameter of the initial bubble.

14. The alkali-free glass substrate according to claim 2, comprising, as represented by mass % based on oxides:
58.5% to 67.5% of $SiO_2$;
18% to 24% of $Al_2O_3$;
0.1% to 1.7% of $B_2O_3$; and
4% to 8.5% of MgO;
3% to 8.5% of CaO:
2% to 10% of SrO; and
0% to 2.5% of BaO.

15. The alkali-free glass substrate according to claim 2, comprising, as represented by mass % based on oxides:
57% to 67.5% of $SiO_2$;
17% to 25% of $Al_2O_3$;
1.8% to 5.5% of $B_2O_3$; and
2% to 8.5% of MgO;
1.5% to 8% of CaO:
0.5% to 8.5% of SrO; and
0% to 1% of BaO.

16. The alkali-free glass substrate according to claim 2, having a Young's modulus of 78 GPa or more.

17. The alkali-free glass substrate according to claim 2, having a sheet thickness of 0.1 mm to 0.5 mm.

18. The alkali-free glass substrate according to claim 2, having a short side length of 2,100 mm or more and a long side length of 2,400 mm or more.

19. The alkali-free glass substrate according to claim 2, having a short side length of 2,900 mm or more and a long side length of 3,200 mm or more.

20. The alkali-free glass substrate according to claim 2, having a density of bubbles that have diameters of more than 100 μm being 0.06 pieces/kg or less.

* * * * *

UNITED STATES PATENT AND TRADEMARK OFFICE
CERTIFICATE OF CORRECTION

PATENT NO. : 11,718,553 B2
APPLICATION NO. : 16/819696
DATED : August 8, 2023
INVENTOR(S) : Motoyuki Hirose and Takashi Enomoto Page 1 of 1

It is certified that error appears in the above-identified patent and that said Letters Patent is hereby corrected as shown below:

In the Claims

Claim 12, Column 14, Lines 43-44:
Please delete:
"initial bubble and is obtained after held at 44 kPa for 5 minutes."
Please replace with:
initial bubble and is obtained after the pressure in the vessel is held at 44 kPa for 5 minutes.

Signed and Sealed this
Twentieth Day of August, 2024

Katherine Kelly Vidal
*Director of the United States Patent and Trademark Office*